United States Patent Office 3,763,099
Patented Oct. 2, 1973

3,763,099
PROCESS FOR PREPARING POLYCARBONATE
USING A GUANIDINE CATALYST
Donald B. G. Jaquiss, New Harmony, Ind., assignor to
General Electric Company
No Drawing. Filed Nov. 1, 1971, Ser. No. 194,507
Int. Cl. C08g 17/13
U.S. Cl. 260—47 XA      5 Claims

ABSTRACT OF THE DISCLOSURE

An improved process for preparing an aromatic carbonate polymer by carrying out the reaction in the presence of a particular catalyst. The particular catalyst employed herein can be either a guanidine or a substituted guanidine and is present during the reaction in an amount of 0.1–10.0 mole percent.

---

This invention is directed to an improved process for preparing an aromatic carbonate polymer of a dihydric phenol and a carbonate precursor wherein the improvement comprises carrying out the reaction in the presence of a particular catalyst. The particular catalyst of this invention is guanidine or a substituted guanidine.

Polycarbonates are well-known thermoplastic materials finding a wide range of uses, particularly for injection molding applications and as glazing sheet for replacement of window glass. The process employed in preparing polycarbonates involves carrying out the reaction in the presence of an acid acceptor and an organic solvent medium which is a solvent for the polycarbonate as it is formed. It is extremely advantageous economically to speed up the reaction so as to increase capacity without having to significantly increase equipment.

As described in U.S. Pat. 3,275,601, it is known to use certain catalysts in a polycarbonate reaction. Unfortunately, these known catalysts, while achieving an increase in the rate of the reaction, leave certain salts present in the polymer requiring additional efforts to remove them from the end product. In addition, these catalysts cannot be easily and completely removed from the final product.

Actually, there is little known about effective catalysis of polycarbonate reactions. U.S. Pat. 3,275,601 probably discloses some of the most effective catalysts known to date for polycarbonate reactions. It has now been surprisingly discovered that particular guanidine compounds are also excellent catalysts for polycarbonate reactions.

Therefore, it is an object of this invention to provide an improved process for preparing polycarbonate.

Another object of this invention is to provide an improved process employing certain catalysts to speed up the reaction for forming polycarbonates.

Yet another object of this invention is to provide an improved process employing certain guanidine catalysts for preparing polycarbonates.

These and other objects of this invention will become apparent from the following detailed description thereof.

Briefly, according to this invention, the foregoing and other objects are attained by reacting a dihydric phenol and a carbonate precursor in the presence of certain catalysts. The improvement in this invention is found in carrying out the reaction in the presence of 0.1–10.0 mol percent of guanidine or a substituted guanidine catalyst.

The following examples are set forth to illustrate more clearly the principle and practice of this invention to those skilled in the art. Unless otherwise specified, where parts or percents are mentioned, they are parts or percents by weight.

EXAMPLE I

To a reactor fitted with a reflux condenser and a mechanical agitator, charge 40 parts of 2,2-bis(4-hydroxyphenyl)propane, 40 parts of 2,2-(3,5,3',5'-tetrabromo-4,4'-dihydroxydiphenyl) propane, 76 parts of water, 300 parts of methylene chloride, 0.75 part of paratertiarybutylphenol and 0.98 part of 1,1,3,3-tetramethyl-2-cyclohexyl guanidine. Phosgene is then added to the reaction mixture at the rate of 0.65 part per minute for a period of 30 minutes while maintaining the pH at 9 by the addition of 15% aqueous solution of sodium hydroxide. After the 30 minute period, the pH is raised to 13. The pH is maintained at 13 by the simultaneous addition of the sodium hydroxide solution and phosgenation for a further period of 10 minutes. The mixture is then stirred for 5 minutes. The polycarbonate is then recovered and dried.

The polymer is found to have an intrinsic viscosity of 0.35 dl./g. as measured in dioxane at 30° C.

EXAMPLE II

Example I is repeated except that no guanidine catalyst is employed herein. The material is recovered from the reaction and is found to have an intrinsic viscosity of less than 0.08 dl./g. This indicates that no significant degree of polymerization is achieved.

EXAMPLE III

To a reactor fitted with a reflux condenser and a mechanical agitator, charge 57 parts of 2,2-bis(4-hydroxyphenyl) propane, 57 parts of water, 325 parts of methylene chloride, 1.2 parts of para-tertiarybutylphenol and 0.61 part of 1,3-bis-pentamethylene-2-phenyl guanidine. Phosgene is then added to the reaction mixture at a rate of 0.65 part per minute for a period of 30 minutes while maintaining the pH at 9 by the addition of a 15% aqueous sodium hydroxide solution. After 30 minutes the pH is raised to 11.0 by the use of additional amounts of sodium hydroxide solution. Phosgenation is continued for the additional 10 minutes at this pH.

The polycarbonate is recovered from solution, dried and is found to have an intrinsic viscosity of 0.48 dl./g. and a hydroxyl content of 0.015 weight percent based on the weight of the polymer.

EXAMPLE IV

Example III is repeated except that no guanidine is employed herein. The material is recovered from the reaction and found to have an intrinsic viscosity of 0.12 dl./g. This indicates that no significant degree of polymerization is achieved.

EXAMPLE V

To a reactor fitted with a reflux condenser and a mechanical agitator, charge 57 parts of 2,2-bis(4-hydroxyphenyl)propane, 57 parts of water, 325 parts of methylene chloride, 1.2 parts of para-tertiarybutylphenol and 1.7 parts of 1,2,3-tricyclohexyl guanidine hydrochloride. Phosgene is then added to the reaction mixture at the rate of 0.65 part per minute for a period of 30 minutes. During the reaction, the pH is maintained at 11.0 by the addition of 15% aqueous sodium hydroxide solution. The pH is then adjusted to 13 by the use of additional sodium hydroxide solution. Phosgenation is then continued for an additional 10 minutes while maintaining the pH at 13.

The polycarbonate is recovered from solution, dried and is found to have an intrinsic viscosity of 0.44 dl./g. and a hydroxyl content of 0.007 weight percent based on the weight of the polymer.

EXAMPLE VI

To a reactor fitted with a reflux condenser and a mechanical agitator, charge 75.2 parts of 2,2-bis(4-hydroxyphenyl)propane, 390 parts of methylene chloride, 200 parts of water, 1.48 parts of para-tertiary butylphenol and 1.63 parts of 1,1,3,3-tetraethyl-2-phenyl guanidine. Phosgene is then added for 0.3 minute at the rate of 0.82 gram per minute. The pH is then controlled at 9 with the simultaneous addition of phosgene and 6.7 N aqueous sodium hydroxide solution for a period of 30 minutes. Forty-five milliliters of 6.7 N sodium hydroxide solution is then added and phosgene addition is continued for an additional 11 minutes. The reaction is then stirred for an additional 18 minutes, during which time 7 milliliters of sodium hydroxide solution is added to maintain a pH of greater than 11.0. The polycarbonate is then recovered from solution, dried and is found to have an intrinsic viscosity of 0.55 dl./g.

EXAMPLE VII

Example VI is repeated except that in place of the 1.63 parts of 1,1,3,3-tetraethyl-2-phenyl guanidine, 1.2 parts of 1,1,3,3-tetramethylphenyl guanidine is employed herein.

The resulting polymer has an intrinsic viscosity of 0.56 dl./g.

EXAMPLE VIII

Example VI is repeated except that 1.2 parts of tetramethyl-2-propyl guanidine is employed herein. The resulting polycarbonate is found to have an intrinsic viscosity of 0.51 dl./g.

This invention is directed to an improved process for preparing a polycarbonate, which improvement comprises carrying out the reaction in the presence of 0.1 to 10.0 weight percent of a catalyst selected from the group consisting of guanidine, substituted guanidine and salt of guanidine and substituted guanidine. The use of the catalyst in a reaction medium consisting of an aqueous caustic solution and an inert organic solvent for the polycarbonate results in obtaining a useful polymer, while without the catalyst, as shown in the examples, no significant degree of polymerization is achieved.

The substituted guanidine selected from the group consisting of compounds of the formulae:

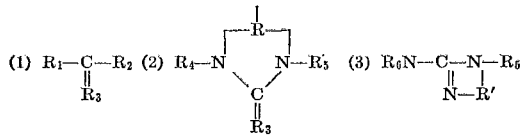

of the instant invention may be either compounds or acid salts of the compounds of the above formula. In the formulae, $R_1$ and $R_2$ are independently selected from the group consisting of a heterocyclic radical containing a nitrogen atom attached to the carbon atom in the above formula or a radical of the formula

and $R_3$ is represented by the formula $$=N-R_8$$

In the above formula, $R_4$, $R_5$, $R_6$, $R_7$ and $R_8$ are independently selected from the group consisting of hydrogen, alkyl or cycloalkyl radicals of 1–10 carbon atoms or aryl radicals, provided, however, that if any of the R's of the substituted guanidine contain three aryl radicals, the remaining R's must be either alkyl radicals or hydrogen. R' in the above formulae is an alkylene radical having a carbon moiety of 2–6 carbon atoms.

In the practice of this invention the catalyst that can be employed herein is guanidine

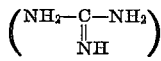

guanidinehydrochloride,
1,1,3,3-tetramethylguanidine,
1,1,3,3-tetramethyl-2-propylguanidine,
1,1,3,3-tetramethyl-2-cyclohexylguanidine,
1,1,3,3-tetraethyl-2-butylguanidine,
1,2,3-tricyclohexylguanidine,
1,2,3-tricyclohexylguanidine hydrochloride,
1,1,3,3-tetra-n-butyl-2-propylguanidine,
1,1,3,3-bis tetramethylene-2-phenylguanidine,
1,1,3,3-bis tetramethylene-2-(2-methylphenyl)guanidine,
1,1,3,3-bis-pentamethylene-2-butylguanidine,
1,1,3,3-bis(oxydiethylene)-2-phenylguanidine,
1,3-dimethyl-1,3-diethyl-2-phenylguanidine,
1,1,3,3-tetramethyl-2-(p-chlorophenyl)guanidine,
1,4-cyclohexane dimethylene bis($N^1,N^2$ tetramethylguanidine,
2,2'-p-phenylene bis-(1,1,3,3-tetramethylguanidine),
1,3-diphenylguanidine,
1,1,3,3-tetramethyl-2($\beta$-naphthyl)guanidine,
1,3-diphenyl-2-propylguanidine.

2-piperidino 4,5-dihydroimidazole:

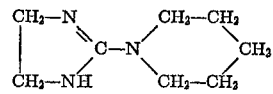

1,3-di-n-butyl 2-imino imidazolidine:

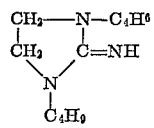

2-phenylimino 1,3-dimethylhexahydropyrimidine:

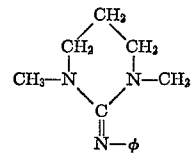

2-n-butylimino 1,3-dimethyl hexahydropyrimidine:

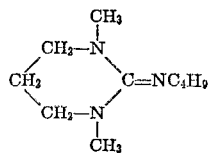

In the practice of the instant invention, the preferred catalyst is phenyl tetramethylguanidine. The preferred salt is phenyl tetramethylguanidinehydrochloride. The aromatic carbonate polymers employed in the practice of this invention are carbonate homopolymers of dihydric phenols, carbonate copolymers of two different dihydric phenols or copolymers of such dihydric phenols with glycols, e.g., ethylene glycol or propylene glycol, dibasic acids, e.g., isophthalic acid or terephthalic acid, or hydroxyl or acid-terminated polyesters, e.g., hydroxyl or acid-terminated polyesters of neopentyl glycol and adipic acid and include those disclosed in U.S. Pats. 3,030,311 and 3,169,121 which are hereby incorporated by reference. Such aromatic carbonate polymers are prepared by reacting a dihydric phenol with a carbonate precursor which may be either a carbonyl halide, e.g. as carbonyl chloride, carbonyl bromide and carbonyl fluoride or a haloformate, e.g., bishaloformates of dihydroxy aromatic compounds (bischloroformates of hydroquinone, etc.) or glycols (bishaloformates of ethylene glycol, neopentyl glycol, propylene glycol, etc.). Preferably, phosgene is employed to prepare the aromatic carbonate polymers employed in the practice of this invention.

In general, the dihydric phenols which can be employed in place of the 2,2-bis(4-hydroxyphenyl) propane used in the examples to prepare the aromatic carbonate polymers are mononuclear or polynuclear aromatic compounds, containing as functional groups, two hydroxyl radicals, each of which is attached directly to a carbon atom of an aromatic nucleus and are hydroquinone, resorcinol, bis(4-hydroxyphenyl) methane, 2,2 - bis(4-hydroxy-3-methylphenyl) propane, 4,4-bis(4-hydroxyphenyl) heptane, 2,2-

(3,3',5,5' - tetrachloro-4,4'-dihydroxy-diphenyl) propane, 2,2-(3,3',5,5'-tetrabomo-4,4'-dihydroxy-diphenyl) propane and 3,3'-dichloro-4,4'-dihydroxydiphenyl methane. Other dihydric phenols are also available and are disclosed in U.S. Pats. 2,999,835, 3,028,365 and 3,334,154 which are incorporated herein by reference. As stated previously, it is, of course, possible to employ two or more different dihydric phenols or a copolymer of a dihydric phenol with a glycol, a hydroxy or an acid-terminated polyester, or a dibasic acid in the event a carbonate copolymer rather than a homopolymer is desired for use in the preparation of the novel aromatic carbonate polymers of this invention.

The method for preparing the aromatic carbonate polymers of this invention, when employing phosgene, involves passing phosgene into a reaction mixture containing a dihydric phenol, for example, and an acid acceptor. The acid acceptor may be used undiluted or diluted with inert organic solvents as, for example, methylene chloride, chlorobenzene, or 1,2-dichloroethane.

The temperature at which the phosgenation reaction proceeds may vary from below 0° C. to about 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the polycarbonate resin of the invention comprises adding phosgene to an aqueous alkaline solution. This is preferably done in the presence of inert solvents such as methylene chloride, 1,2 dichloroethane and the like.

Still another method for preparing such carbonate polymers involves the phosgenation of an agitated suspension of an alkaline earth metal hydroxide and a dihydric phenol used in a non-aqueous medium such as chlorobenzene, methylene chloride, ethylene dichloride, etc. This reaction is illustrated by the addition of phosgene to a slurry of calcium hydroxide and 2,2-bis(4-hydroxyphenyl)-propane in an inert polymer solvent such as methylene chloride. The organic solvent should preferably be a polymer solvent but need not necessarily be a good solvent for the reactants.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What is claimed is:

1. In a process for preparing an aromatic carbonate polymer by reacting a dihydric phenol and a carbonate precursor in the presence of an acid acceptor, the improvement which comprises increasing the rate of reaction by carrying out the reaction in the presence of 0.1–10.0 mole percent of a catalyst selected from the group consisting of guanidine, a salt of guanidine, substituted guanidine selected from the group consisting of compounds of the formulae:

(1) 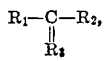

(2) 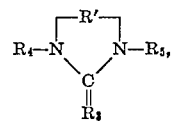

(3) 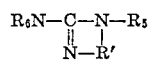

and (4) a salt of the compounds of the above formulae, wherein $R_1$ and $R_2$ are independently selected from the group consisting of a heterocyclic radical containing a nitrogen attached to the carbon atom in the above formulae or a radical of the formula (3) 

and $R_3$ is represented by the formula $$=NR_8$$

wherein $R_4$, $R_5$, $R_6$, $R_7$ and $R_8$ are independently selected from the group consisting of hydrogen, alkyl or cycloalkyl radicals of 1–10 carbons atoms or aryl radicals, provided, however, that if any of the R's of the substituted guanidine contain three aryl radicals, the remaining R's must be selected from the group consisting of alkyl radicals or hydrogen, R' is an alkylene radical of 2–6 carbon atoms.

2. The process of claim 1 wherein the dihydric phenol is 2,2-bis(4-hydroxyphenyl) propane.

3. The process of claim 1 wherein the substituted guanidine is phenyl tetramethyl guanidine.

4. The process of claim 1 wherein the acid salt of the substituted guanidine is the hydrogen chloride salt.

5. The process of claim 1 wherein the acid salt of the substituted guanidine is phenyl tetramethyl guanidine hydrogen chloride.

References Cited

UNITED STATES PATENTS 3,275,601   9/1966   Schnell et al. _____ 260—47

OTHER REFERENCES

N.V. Onderzoekingsinstituut Research, Chemical Abstracts, vol. 58 (1963), col. 2518e.

WILBERT J. BRIGGS, SR., Primary Examiner

U.S. Cl. X.R.

260—77.5 D